United States Patent
Wan et al.

(10) Patent No.: US 9,265,301 B2
(45) Date of Patent: Feb. 23, 2016

(54) MOLD FOR FOOTWEAR WITH SIPES AND METHOD OF MANUFACTURING SAME

(75) Inventors: Tee L. Wan, Portland, OR (US); Chia-Yi Wu, Long An Province (VN); Thienchai Chaisumrej, Bangkok (TH)

(73) Assignee: NIKE, Inc., Beaverton, OR (US)

( * ) Notice: Subject to any disclaimer, the term of this patent is extended or adjusted under 35 U.S.C. 154(b) by 67 days.

(21) Appl. No.: 13/546,652

(22) Filed: Jul. 11, 2012

(65) Prior Publication Data

US 2014/0015169 A1  Jan. 16, 2014

(51) Int. Cl.
*B29C 45/37* (2006.01)
*A43B 9/00* (2006.01)
*A43B 13/04* (2006.01)
*A43B 13/14* (2006.01)
*A43B 13/18* (2006.01)
*B29D 35/00* (2010.01)
*B29D 35/12* (2010.01)

(52) U.S. Cl.
CPC . *A43B 9/00* (2013.01); *A43B 13/04* (2013.01); *A43B 13/141* (2013.01); *A43B 13/187* (2013.01); *B29D 35/0018* (2013.01); *B29D 35/122* (2013.01); *B29D 35/128* (2013.01)

(58) Field of Classification Search
CPC ........ A43B 9/00; A43B 13/04; A43B 13/141; A43B 13/187; B29D 35/0018; B29D 35/122; B29D 35/128; B29D 35/0063; B29D 35/02; B29D 35/04; B29D 35/06–35/088
USPC .............................. 264/328.1; 425/129.2, 542
See application file for complete search history.

(56) References Cited

U.S. PATENT DOCUMENTS

| 4,217,081 A | 8/1980 | Rooney |
| 6,115,945 A | 9/2000 | Ellis, III |
| 7,650,707 B2 * | 1/2010 | Campbell et al. ............... 36/127 |
| 2005/0262739 A1 | 12/2005 | McDonald |
| 2006/0061012 A1 * | 3/2006 | Hatfield ............... A43B 3/0057 264/299 |
| 2007/0169379 A1 | 7/2007 | Hazenberg |
| 2010/0287788 A1 | 11/2010 | Spanks |

FOREIGN PATENT DOCUMENTS

| JP | 2011-244903 A | 12/2011 |
| WO | 9111924 A1 | 8/1991 |
| WO | 2008115743 A1 | 9/2008 |
| WO | 2012045512 A1 | 4/2012 |

OTHER PUBLICATIONS

Proto Labs, "Injection-Molded Part Radiusing and Draft Guidelines", 5 pages, 1999.*
2007 Nike Free 5.0.*
International Search Report and Written Opinion dated Oct. 16, 2013 issued in corresponding PCT/US2013/049838.
Sep. 29, 2015 (CN) Office Action App. 201380036226.0.

* cited by examiner

*Primary Examiner* — Jill Heitbrink
(74) *Attorney, Agent, or Firm* — Banner & Witcoff, Ltd.

(57) ABSTRACT

A mold used to form a midsole for an article of footwear and a method of manufacturing are disclosed. The mold includes a first portion and a second portion cooperating to define a midsole recess, the first portion including a major recess and plurality of wall segments extending throughout the major recess and cooperating to define a plurality of minor recesses. A fillet is provided at each intersection of adjacent wall segments. The mold may have a draft angle of less than or equal to approximately 2.5 degrees.

10 Claims, 4 Drawing Sheets

MOLD FOR FOOTWEAR WITH SIPES AND METHOD OF MANUFACTURING SAME

FIELD

Aspects of this invention relate generally to a mold for a midsole for an article of footwear, and, in particular, to a method and mold for manufacturing a midsole having sipes.

BACKGROUND

To keep a wearer safe and comfortable, footwear is called upon to perform a variety of functions. For example, the sole structure of footwear should provide adequate support and impact force attenuation properties to prevent injury and reduce fatigue, while at the same time provide adequate flexibility so that the sole structure articulates, flexes, stretches, or otherwise moves to allow an individual to fully utilize the natural motion of the foot Conventional articles of athletic footwear generally include two primary elements, an upper and a sole structure. The upper is secured to the sole structure and forms a void on the interior of the footwear for comfortably and securely receiving a foot. The sole structure is secured to a lower portion of the upper and is positioned between the foot and the ground. The sole structure generally incorporates multiple layers that are conventionally referred to as an insole, a midsole, and an outsole. The insole, or sockliner, is a thin, compressible member located within the void and proximate a lower surface of the foot to enhance footwear comfort. The midsole, which is conventionally secured to the upper along the length of the upper, forms a middle layer of the sole structure and serves a variety of purposes that include attenuating ground (or other contact surface) reaction forces to lessen stresses upon the foot and leg; controlling potentially harmful foot motions, such as over pronation; and beneficially utilizing such ground reaction forces for more efficient toe-off. The outsole forms a ground-engaging portion (or other contact surface-engaging portion) of the sole structure, and is formed from a durable and wear-resistant material that includes texturing to improve traction.

The conventional midsole is primarily formed from a resilient, polymer foam material that extends throughout the length of the footwear, often by way of a molding process. The properties of the polymer foam material in the midsole are primarily dependent upon factors that include the dimensional configuration of the midsole and the specific characteristics of the material selected for the polymer foam, including the hardness or density of the polymer foam material. By varying these factors throughout the midsole, the relative stiffness and degree of ground reaction force attenuation may be altered to meet the specific demands of the activity for which the footwear is intended to be used. In addition to polymer foam materials, conventional midsoles may include, for example, one or more fluid-filled bladders (e.g., filled with air or other gasses) and moderators.

Midsoles may be formed with sipes, which are vertically extending slots or recesses formed in the midsole that form sole elements throughout the midsole and an articulated configuration that provides flexibility for the footwear. The sipes may be formed during a molding process used to form the midsole, or they may be cut into the midsole with a hot knife or other suitable members after the midsole has been formed.

A mold used to form a midsole may include blades extending upwardly from a bottom portion of the mold, with the blades defining the sipes within the material used to form the midsole. In some footwear the sipes may be relatively narrow and relatively deep, in which case the blades used to make such sipes may be susceptible to breakage.

It would be desirable to provide a mold and method of manufacturing footwear with sipes that reduces or overcomes some or all of the difficulties inherent in prior known devices. Particular advantages will be apparent to those skilled in the art, that is, those who are knowledgeable or experienced in this field of technology, in view of the following disclosure of the invention and detailed description of certain embodiments.

SUMMARY

The principles of the invention may be used to provide a mold for footwear having sipes, and a method of manufacturing footwear having sipes. In accordance with a first aspect, a method of manufacturing an article of footwear includes injecting a material into a midsole recess in a mold, the mold including a first portion and a second portion cooperating to define the midsole recess, the first portion including a major recess and plurality of wall segments extending throughout the major recess and cooperating to define a plurality of minor recesses, and a fillet provided at each intersection of adjacent wall segments; closing the mold by positioning the first and second portions in contact with one another; heating the mold for a predetermined period of time at a predetermined temperature to form a midsole; removing the midsole from the mold; and allowing the midsole to expand.

In accordance with another aspect, A mold for forming a midsole for an article of footwear includes a first portion including a major recess formed therein and a plurality of wall segments extending throughout the recess and defining a plurality of minor recesses within the major recess. Each of a plurality of fillets is positioned between a pair of adjacent wall segments. A second portion and the major recess cooperate to define a midsole recess when the first portion and the second portion are positioned in contact with one another such that the mold is in a closed condition.

By providing a mold and method of manufacturing footwear with sipes, an article of footwear with relatively deep and narrow sipes can be provided, which leads to improved aesthetics and performance, and reduces the chances of the mold encountering breakage. These and additional features and advantages disclosed here will be further understood from the following detailed disclosure of certain embodiments.

Figure 1:
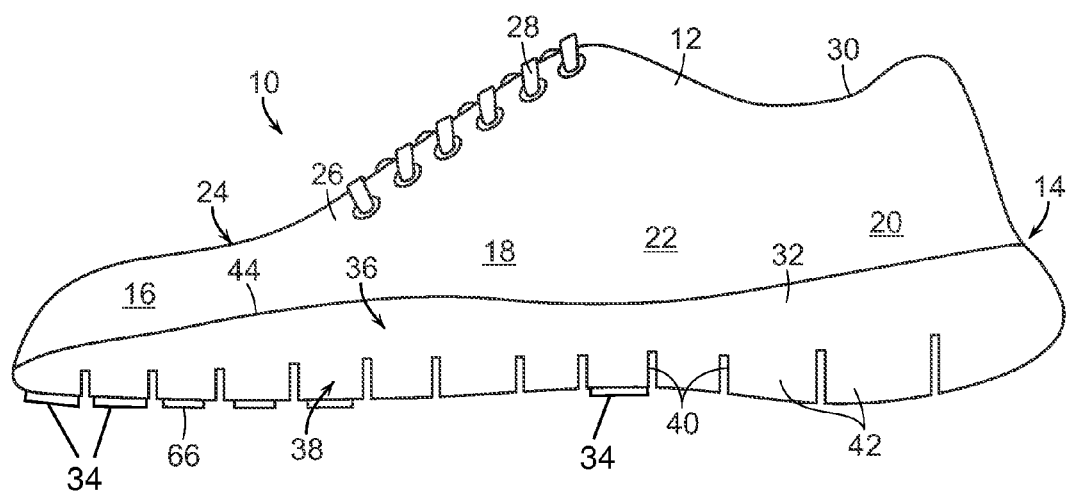
FIG. 1 is an elevation view of an article of footwear with a sole structure including sipes.

The figures referred to above are not drawn necessarily to scale, should be understood to provide a representation of particular embodiments of the invention, and are merely conceptual in nature and illustrative of the principles involved. Some features of the mold used to form a sole structure with sipes depicted in the drawings have been enlarged or distorted relative to others to facilitate explanation and understanding. The same reference numbers are used in the drawings for similar or identical components and features shown in various alternative embodiments. Molds used for forming footwear and sole structures for the same as disclosed herein would have configurations and components determined, in part, by the intended application and environment in which they are used.

DETAILED DESCRIPTION OF CERTAIN PREFERRED EMBODIMENTS

An article of footwear 10 is depicted in FIG. 1 as including an upper 12 and a sole structure 14. Article of footwear 10 can be any of various articles of casual footwear having configurations suitable, for example, for walking or lounging. Footwear 10 may also be one of a wide range of athletic footwear styles, including shoes that are suitable for soccer, running, basketball, baseball, cross-training, football, rugby, tennis, and volleyball, for example. An individual skilled in the relevant art will appreciate, therefore, that the concepts disclosed herein with regard to footwear 10 may be applied to a wide variety of footwear styles, in addition to the specific styles discussed herein and depicted in the accompanying figures.

For purposes of reference in the following description, footwear 10 may be divided into three general regions: a forefoot region 16, a midfoot region 18, and a heel region 20. Regions 16-20 are not intended to demarcate precise areas of footwear 10. Rather, regions 16-20 are intended to represent general areas of footwear 10 that provide a frame of reference during the following discussion. Although regions 16-20 apply generally to footwear 10, references to regions 16-20 also may apply specifically to upper 12, sole structure 14, or individual components within either upper 12 or sole structure 14.

Upper 12 defines a void or chamber for receiving a foot. For purposes of reference, upper 12 includes a medial side 22, an opposite lateral side 24, and a vamp or instep area 26. Lateral side 24 is positioned to extend along a lateral side of the foot (i.e., the outside) and generally passes through each of regions 16-20. Similarly, medial side 22 is positioned to extend along an opposite medial side of the foot (i.e., the inside) and generally passes through each of regions 16-20. Upper 12 may also include a closure mechanism, such as lace 28. Upper 12 also includes an ankle opening 30 that provides the foot with access to the void within upper 12.

Sole structure 14 includes a midsole 32 positioned below upper 12. Midsole 32 serves to provide shock-attenuation and energy-absorption for footwear 10. In certain embodiments, midsole 32 is secured to upper 12. Midsole 32 may be secured to upper 12 with an adhesive, for example. Suitable adhesives are well known in the art and need not be discussed in greater detail here. Midsole 32 may be secured to upper 12 with any other suitable fastening means including, for example, stitching, or stitching and adhesive. Other suitable means of fastening midsole 32 to upper 12 will become readily apparent to those skilled in the art, given the benefit of this disclosure.

Suitable materials for midsole 32 include any of the conventional polymer foams that are utilized in footwear midsoles, including phylon (Ethylene Vinyl Acetate ('EVA') foam), injection phylon, and polyurethane foam. Other suitable materials for midsole 32 will become readily apparent to those skilled in the art, given the benefit of this disclosure.

In certain embodiments, an outsole 34 may be positioned below midsole 32. Outsole 34 may be secured to midsole 32 and/or upper 12 with an adhesive, or any other suitable fastening means including, for example, stitching. In certain embodiments, outsole 34 may be formed of a layer of material secured to and extending over a portion of the bottom surface of midsole 32. In other embodiments, outsole 34 may be formed of a plurality of individual outsole members 34 secured to the bottom surface of midsole 32, as illustrated in FIG. 1. Suitable materials for outsole 34 include any of the conventional rubber materials that are utilized in footwear outsoles, such as carbon black rubber compound. Other suitable materials for outsole 34 will become readily apparent to those skilled in the art, given the benefit of this disclosure.

Midsole 32 includes a connecting portion 36 and a siped portion 38 that includes a plurality of sipes 40 defining a plurality of sole elements 42. Connecting portion 36 has an upper surface 44 positioned adjacent to upper 22, and may be secured directly to upper 22, thereby providing support for the foot. Upper surface 4 may, therefore, be contoured to conform to the natural, anatomical shape of the foot. Accordingly, the area of upper surface 44 that is positioned in heel region 20 may have a greater elevation than the area of upper surface 44 in forefoot region 16. In addition, upper surface 44 may form an arch support area in midfoot region 18, and peripheral areas of upper surface 44 may be generally raised to provide a depression for receiving and seating the foot. In further embodiments, upper surface 44 may have a non-contoured configuration.

The thickness of connecting portion 36, which is defined as the dimension that extends between upper surface 44 and the tops of sipes 40, may vary along the longitudinal length of midsole 32. The thickness of connecting portion 36 may range from approximately 5 mm to approximately 15 mm in certain embodiments. One skilled in the relevant art will recognize, however, that a variety of thickness dimensions and variations will be suitable for connecting portion 36.

Areas of connecting portion 36 that exhibit a relatively thin thickness will, in general, possess more flexibility than areas of connecting portion 36 that exhibit a greater thickness. Variations in the thickness of connecting portion 36 may, therefore, be utilized to modify the flexibility of sole structure 14 in specific areas. For example, forefoot region 16 may be configured to have relatively high flexibility by forming connecting portion 36 with a lesser thickness. A relatively low flexibility may be imparted to midfoot region 18 by forming connecting portion 36 with a greater thickness. Similarly, an intermediate flexibility may be imparted to heel region 20 by forming connecting portion 36 with a thickness that is between the thicknesses of forefoot region 16 and midfoot region 18.

Figure 2:
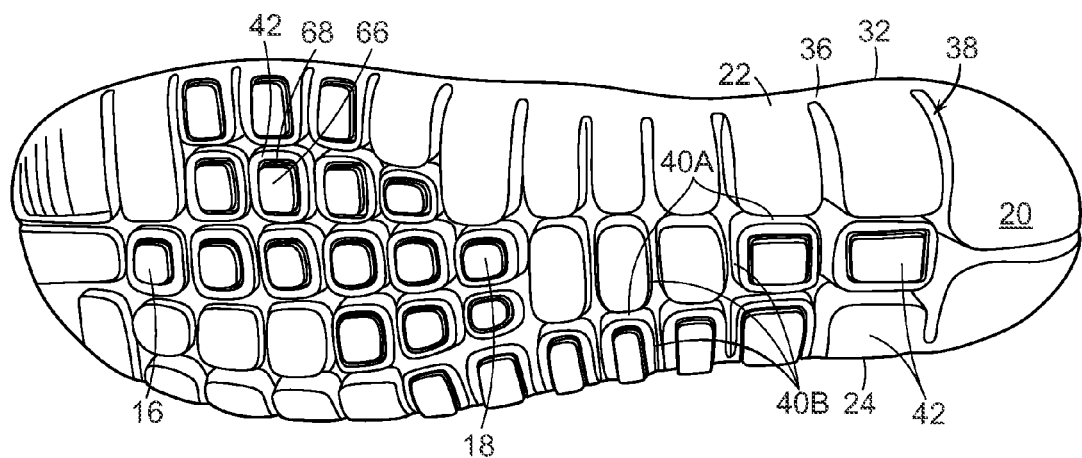
FIG. 2 is a perspective view of a bottom of the sole structure of the article of footwear of FIG. 1.

The right midsole 32 for article of footwear 10 is seen in FIG. 2. As seen here, siped portion 38 forms a plurality of individual, separate sole elements 42 that are separated by a plurality of sipes 40. Sole elements 42 are discrete portions of midsole 32 that extend downward from connecting portion 36. In addition, sole elements 42 are secured to connecting portion 40 and may be formed of unitary, that is, one-piece construction with connecting portion 36. The shape of each sole element 42 is determined by the positions of the various sipes 40. As depicted in FIG. 2, some sipes 40 extend in a generally longitudinal direction along sole structure 14, while other sipes 40 extend in a generally lateral direction. This positioning of sipes 40 forms a majority of sole elements 42 to exhibit a generally square, rectangular, or trapezoidal shape. The rearmost sole elements 42 have a quarter-circular shape due to the curvature of sole structure 14 in heel region 20. It is to be appreciated that sole elements 42 may have any desired shape.

The depth of sipes 40 and, naturally, the thickness of siped portion 38, may vary along the longitudinal length of midsole 32. The depth of sipes 40 may vary between approximately 5 mm and approximately 10 mm. The thickness of siped portion 38 may, in certain embodiments, increase in a direction that extends from forefoot region 16 to heel region 20. One skilled in the relevant art will recognize, however, that a variety of thickness dimensions and variations will be suitable for siped portion 36 and, therefore, for the depth of sipes 40.

The shape of each sole element 42, as discussed above, is determined by the positions of the various sipes 40, which are incisions or spaces that extend upward into midsole 32 and extend between sole elements 42. Sipes 40 increase the flexibility of sole structure 14 by forming an articulated configuration in midsole 32. Whereas the conventional footwear midsole is a unitary element of polymer foam, sipes 40 form flexion lines in sole structure 14 and, therefore, have an effect upon the directions of flex in midsole 32.

Lateral flexibility of sole structure 14 (i.e., flexibility in a direction that extends between a lateral side and a medial side) is provided by the longitudinally extending sipes 40A. The longitudinal sipes 40A may have a straight or linear configuration, or a generally curved or s-shaped configuration. In general, the depth of the longitudinally extending sipes 40A increase as sipes 40 extend from forefoot region 16 to heel region 20.

Longitudinal flexibility of sole structure 14 (i.e., flexibility in a direction that extends between forefoot regions 16 and heel region 20) is provided by the laterally extending sipes 40B. Sipes 40B are generally parallel and extend in a medial-lateral direction across midsole 32.

The positions and orientations of sipes 40 are selected to complement the natural motion of the foot during the running cycle. In general, the motion of the foot during running proceeds as follows: Initially, the heel strikes the ground, followed by the ball of the foot. As the heel leaves the ground, the foot rolls forward so that the toes make contact, and finally the entire foot leaves the ground to begin another cycle. During the time that the foot is in contact with the ground, the foot typically rolls from the outside or lateral side to the inside or medial side, a process called pronation. That is, normally, the outside of the heel strikes first and the toes on the inside of the foot leave the ground last. Sipes 40B ensure that the foot remains in a neutral foot-strike position and complement the neutral forward roll of the foot as it is in contact with the ground. Sipes 40A provide lateral flexibility in order to permit the foot to pronate naturally during the running cycle.

A mold assembly 46 used to form midsole 32 is seen in FIGS. 3-7. Mold assembly 46 as illustrated here is used to form the left midsole 32 of an article of footwear. It is to be appreciated that a corresponding mold assembly can be used to from the mating right midsole for the article of footwear. Mold assembly 46 includes a first portion 48 and a second portion 50, which cooperate to define a midsole recess 52 in which midsole 32 is formed. In the illustrated embodiment, first portion 48, which is positioned beneath second portion 50, forms a bottom surface and a portion of the medial and lateral sides of midsole 32, while second portion 50 forms a top surface and a complimentary portion of the medial and lateral sides of midsole 32. It is to be appreciated that in other embodiments, first and second portions 48, 50 can have a different positional relationship with respect to one another.

In certain embodiments, mold assembly 46 and its component parts is formed of steel. In other embodiments, mold assembly 46 may be formed of aluminum or other metals. Other suitable materials for mold assembly 46 will become readily apparent to those skilled in the art, given the benefit of this disclosure.

Figure 3:
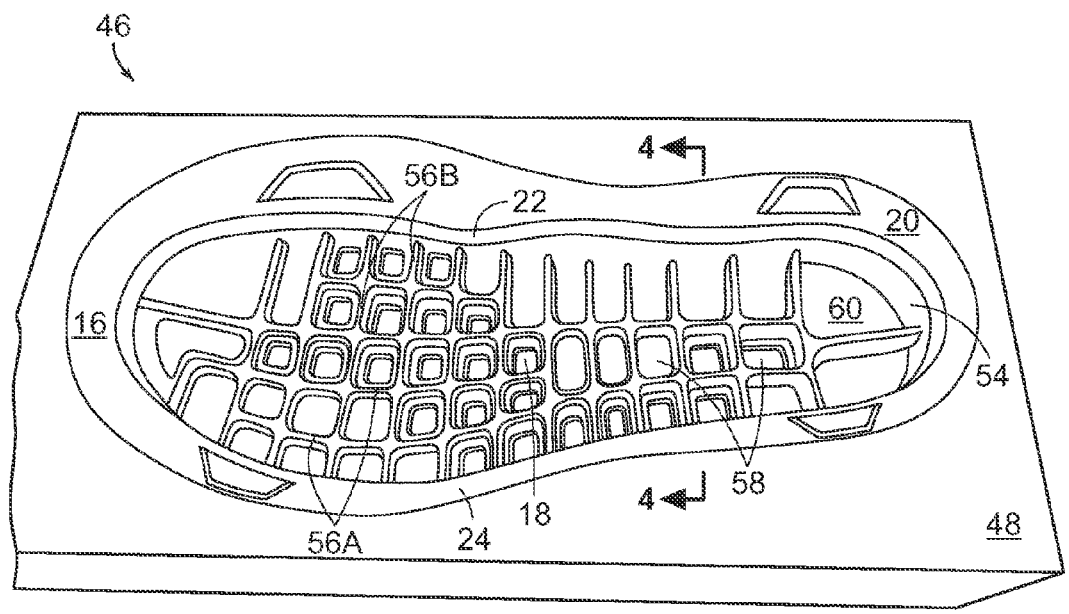
FIG. 3 is a perspective view of a first portion of a mold use to make the sole structure of FIG. 2.
Figure 4:
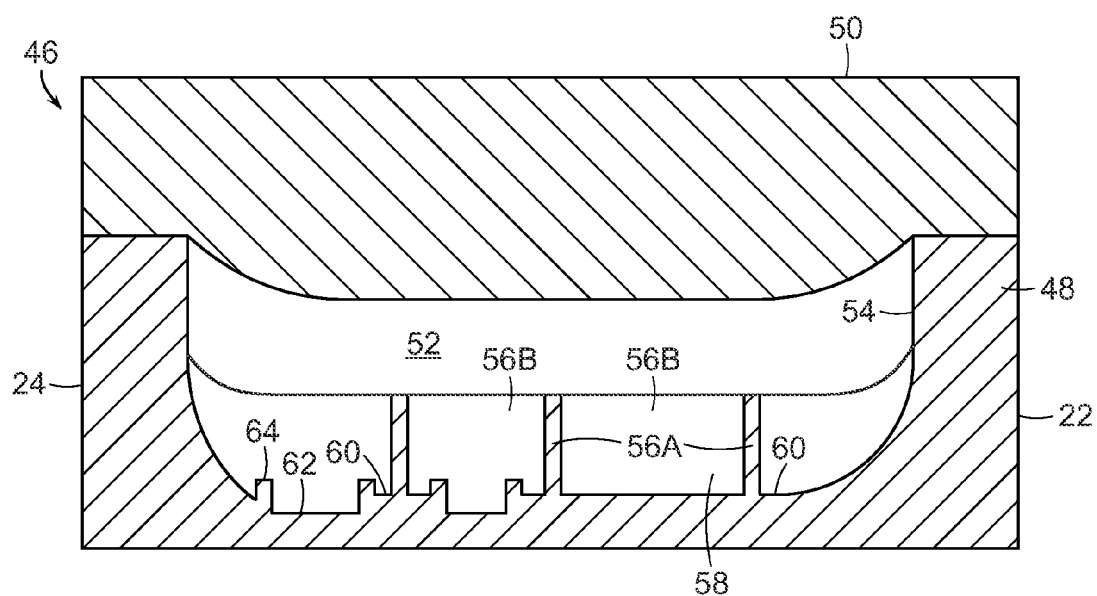
FIG. 4 is a section view of the first portions of the mold of FIG. 3, taken along the line 4-4 in FIG. 3, shown with a second portion of the mold in a closed condition.

As seen in FIG. 3, first portion 48 includes a major recess 54 that is substantially foot-shaped and serves to defines the bottom surface and the medial and lateral portions of midsole recess 52. A plurality of wall segments 56 extend throughout major recess 54 and serve to define a plurality of minor recesses 58. Wall segments 56 extend substantially vertically upward from a bottom surface 60 of major recess 54.

A plurality of longitudinally extending wall segments 56A are positioned in major recess 54, each of which corresponds to a longitudinally extending sipe 40A of midsole 32. Thus, wall segments 56A may have a straight or linear configuration, or a generally curved or s-shaped configuration.

Similarly, a plurality of laterally extending wall segments 56B are positioned in major recess 54, each of which corresponds to a laterally extending sipe 40B of midsole 32. Consequently, all segments 56B are generally parallel and extend in a medial-lateral direction across major recess 54.

In certain embodiments, wall segments 56 are less than or equal to approximately 2.5 mm wide, producing sipes 40 that are also less than or equal to approximately 2.5 mm wide. As discussed below, midsole 32 will expand upon removal from mold assembly 46, with the amount of expansion being dependent on the material used to form midsole 32. Thus, to produce a sipe 40 of a desired width, or height, the width or height of the corresponding wall segment can be calculated based on the rate of expansion of the material used to form midsole 32. It is to be appreciated that thin and tall sipes are advantageous in that they provide enhanced aesthetics for footwear 10 as well as improved performance.

In certain embodiments, one or more minor recesses 58 includes a central recess 62 formed in bottom surface 60, with a peripheral rib 64 extending upwardly from bottom surface 60 about an entire periphery of central recess 62. Central recess 62 and peripheral rib 64 cooperate to form a corresponding sole projection 66 on a bottom surface of a corresponding sole element 42, with a peripheral groove 68 extending about an entire periphery of projection 66. In certain embodiments, as seen in the illustrated embodiment, projections 66 exhibit a generally square, rectangular, or trapezoidal shape, corresponding to the sole elements 42 on which the projections 66 are positioned. It is to be appreciated that may have any desired shape and are not necessarily limited to the shape of the underlying sole element 42 on which they are positioned.

Figure 6:
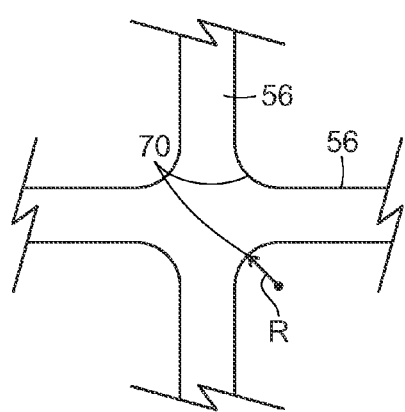
FIG. 6 is an enlarged plan view of parts of wall segments of the first portion of the mold of FIG. 3.

As seen in FIG. 6, the interior angle at the intersection of adjacent wall segments 56A and 56B is rounded off, with a fillet 70. When midsole 32 is formed in mold assembly 46, fillets 70 naturally cause each sole element 42 to have rounded corners between its sidewalls. Fillets 70 provide additional material at the intersections of adjacent wall segments 56A and 56B, thereby serving to strengthen each wall segment 56 and, therefore, reducing the possibility of fracture or other breakage of wall segments 56. This strengthening of wall segments 56 allows the wall segments 56 to have a greater height and to be thinner than they otherwise without the additional strength provided by fillets 70. In certain embodiments, fillets 70 have a radius of between approximately 1 mm and approximately 5 mm.

Figure 7:
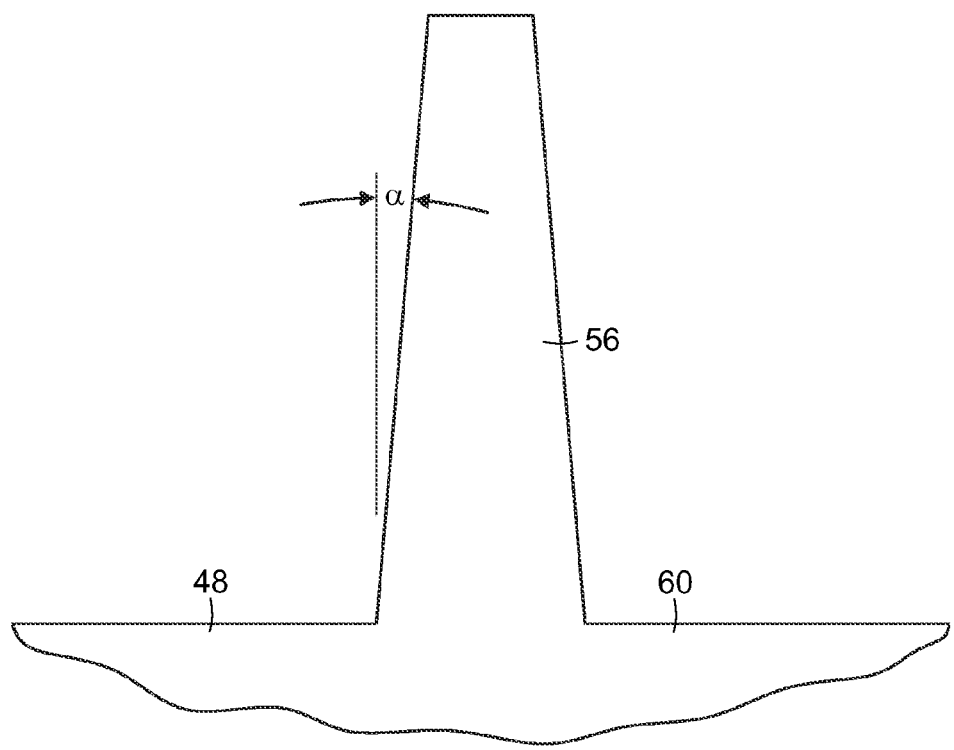
FIG. 7 is an elevation view of a wall segment of the first portion of the mold of FIG. 3.
Figure 8:
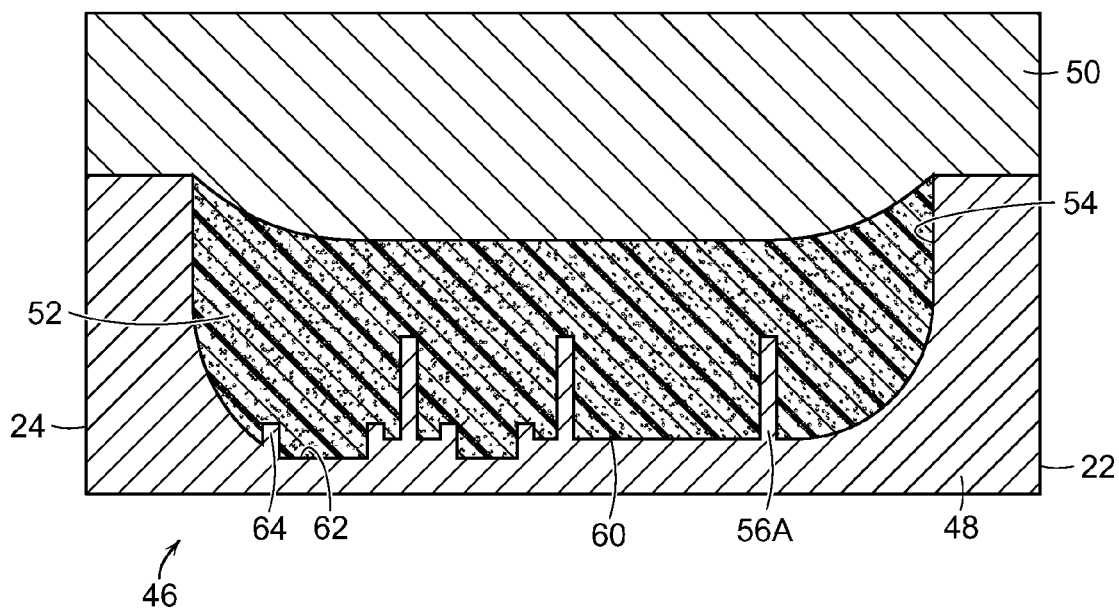
FIG. 8 is a section view of the mold of FIG. 3, shown with a material used to form the midsole of the article of footwear of FIG. 1 contained within a major recess of the mold.

As noted above, wall segments 56 extend upwardly from bottom surface 60 of major recess 54. As seen in FIG. 7, the draft angle α is the angle between each wall segment 56 and a vertical line extending upwardly from bottom surface 60. Typical prior art molds used for forming footwear with sips are formed with wall segments having a draft angle of approximately 5° or more in order to provide wall strength and reduce the possibility of breakage.

The advantageous construction of wall segments 56 with fillets 70 allows for wall segments 56 with draft angle α that is less than or equal to approximately 2.5°. Providing such a small draft angle provides for sipes with straighter sides, which leads to enhanced aesthetics as well as improved performance for footwear 10.

Figure 5:
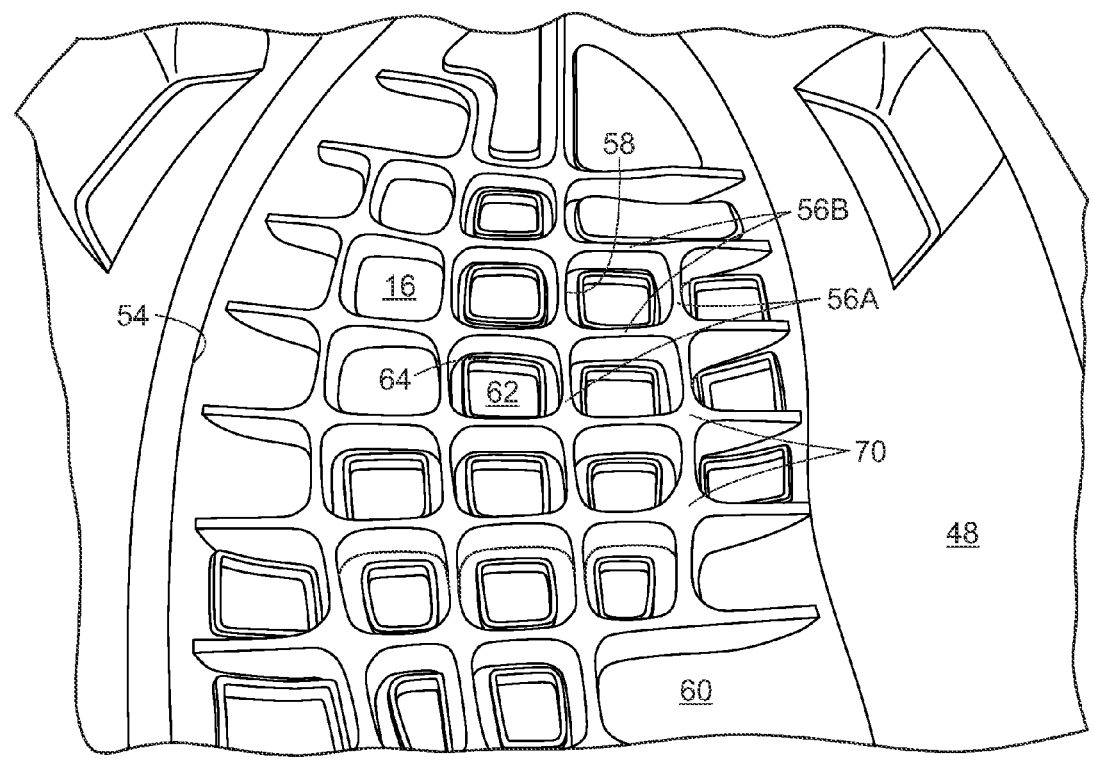
FIG. 5 is a perspective view of part of the first portion of the mold of FIG. 3.

To form midsole 32 of the article of footwear 10 in mold assembly 46, mold assembly 46 is closed, as seen in FIG. 5, so that first portion 48 and second portion 50 are in contact with one another. It is to be appreciated that first portion 48 and second portion 50 may be hinged together, or they may be separate elements that are suitably aligned and placed in contact with one another.

A material 72 is then injected into midsole recess 52 of mold assembly 46 through one or more channels in mold assembly 46 (not shown) in known fashion. Material 72 flows around and over wall segments 56 and ribs 64, as well as into minor recesses 58 and central recesses 62. Consequently, material 72 takes on the shape of midsole recess 52, forming midsole 32. During the molding process, sipes 40 are formed in the areas where wall segments 56 are positioned, with projections 66 and grooves 68 being formed where recesses 62 and ribs 64 are positioned, respectively.

In certain embodiments, material 72 is injection phylon (Ethylene Vinyl Acetate or 'EVA'). Other suitable materials for forming midsole 32 will become readily apparent to those skilled in the art, given the benefit of this disclosure.

Mold assembly 46 with material 72 therein is then heated to a predetermined temperature for a predetermined period of time. In certain embodiments, mold assembly 46 is heated to a temperature of between about 125° C. and about 135° C. In certain embodiments, mold assembly 46 is heated for between about 5 and about 8 minutes.

After this heating step is complete, mold assembly 46 is opened, and midsole 32 is removed from mold assembly 46. It is to be appreciated that after being removed, midsole 32 expands to some degree. The degree to which midsole 32 expands at this point is dependent on the material of which it is made. In certain embodiments, a midsole 32 made of injection phylon may expand to approximately 163% of its original size. With other materials, midsole 32 may expand to approximately 145% of its original size. Midsole 32 is then cured and trimmed as necessary, and then secured to upper 12 with an adhesive or other suitable fastening means. An outsole 34 may then be secured to midsole 32 in any desired manner.

In certain embodiments, a release agent may be applied to the surfaces of first portion 48 and second portion 50 in order to facilitate the separation of midsole 32 from mold assembly 46 after its formation. The release agent may be a spray release agent or any other suitable release agent. Suitable materials for the release agent include, for example, siloxane and water. Other suitable release agents will become readily apparent to those skilled in the art, given the benefit of this disclosure.

Thus, while there have been shown, described, and pointed out fundamental novel features of various embodiments, it will be understood that various omissions, substitutions, and changes in the form and details of the devices illustrated, and in their operation, may be made by those skilled in the art without departing from the spirit and scope of the invention. For example, it is expressly intended that all combinations of those elements and/or steps which perform substantially the same function, in substantially the same way, to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. A method of manufacturing an article of footwear comprising
    injecting a material into a midsole recess in a mold, the mold including a first portion and a second portion cooperating to define the midsole recess, the first portion including a major recess and a plurality of wall segments extending throughout the major recess and cooperating to define a plurality of minor recesses, at least one wall segment having a thickness less than or equal to about 2.5 mm, a height of between approximately 5 mm and approximately 10 mm, and a draft angle of less than or equal to approximately 2.5 degrees, a fillet provided at each intersection of adjacent wall segments, at least one fillet having a radius of between approximately 1 mm and approximately 5 mm;
    closing the mold by positioning the first and second portions in contact with one another;
    heating the mold for a predetermined period of time at a predetermined temperature to form a midsole;
    removing the midsole from the mold; and
    allowing the midsole to expand.

2. The method of claim 1, wherein the material is EVA.

3. The method of claim 1, wherein the first portion includes a plurality of central recesses and a plurality of ribs, each central recess formed in a bottom surface of a minor recess, and each rib extending upwardly from the bottom surface around a periphery of one of the central recesses.

4. The method of claim 1, further comprising the step of securing the midsole to an upper.

5. The method of claim 1, further comprising the step of securing an outsole to the midsole.

6. The method of claim 1, wherein a first plurality of the wall segments extend substantially transversely across the major recess and a second plurality of the wall segments extend substantially longitudinally along the major recess.

7. The method of claim 1, wherein the midsole recess is substantially foot-shaped.

8. A mold for forming a midsole for an article of footwear comprising:
    a first portion including:
        a major recess formed therein;
        a plurality of wall segments extending throughout the major recess and defining a plurality of minor recesses within the major recess, at least one wall segment having a thickness less than or equal to about 2.5 mm, a height of between approximately 5 mm and approximately 10 mm, and a draft angle of less than or equal to approximately 2.5 degrees; and
        a plurality of fillets, each fillet positioned between a pair of adjacent wall segments, at least one fillet having a radius of between approximately 1 mm and approximately 5 mm; and
    a second portion, the second portion and the major recess cooperating to define a midsole recess when the first portion and the second portion are positioned in contact with one another such that the mold is in a closed condition.

9. The mold of claim 8, wherein a first plurality of the wall segments extend substantially transversely across the major recess and a second plurality of the wall segments extend substantially longitudinally along the major recess.

10. The mold of claim 8, wherein the midsole recess is substantially foot-shaped.

\* \* \* \* \*